Figure 1:
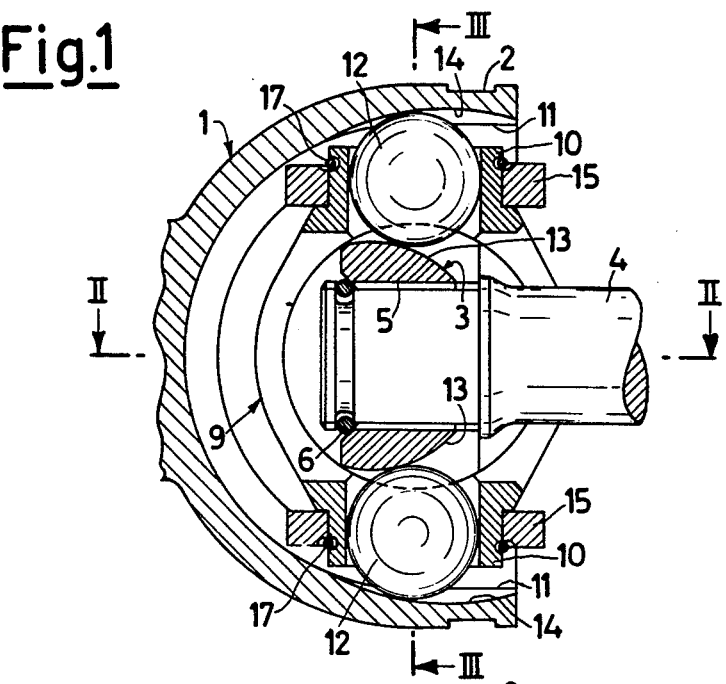

United States Patent [19]

Staeheli et al.

[11] 4,244,196
[45] Jan. 13, 1981

[54] HOMOKINETIC JOINT

[75] Inventors: Nicolas Staeheli; Francesco Maiocchi; Walter Wüerth, all of Milan, Italy

[73] Assignee: Oerlikon Italiana SpA, Milan, Italy

[21] Appl. No.: 878,876

[22] Filed: Feb. 17, 1978

[30] Foreign Application Priority Data

Mar. 2, 1977 [IT] Italy .............................. 20837 A/77

[51] Int. Cl.³ .............................................. F16D 3/30
[52] U.S. Cl. ............................................. 64/21; 64/7
[58] Field of Search .............................. 64/21, 17, 7, 8

[56] References Cited

U.S. PATENT DOCUMENTS

| 2,914,930 | 12/1959 | Wildhaber | 64/21 |
| 3,204,429 | 9/1965 | Kayser | 64/21 |
| 3,218,827 | 11/1965 | Auctor | 64/21 |
| 3,298,201 | 1/1967 | Cadiou | 64/21 |
| 3,357,207 | 12/1967 | Orain | 64/21 |
| 3,520,152 | 7/1970 | Schmid | 64/21 |
| 3,522,714 | 8/1970 | Wildhaber | 64/21 |
| 3,550,396 | 12/1970 | Miller | 64/21 |
| 3,668,893 | 6/1972 | Schmid | 64/21 |

Primary Examiner—Ira S. Lazarus
Assistant Examiner—Magdalen Moy
Attorney, Agent, or Firm—Stevens, Davis, Miller & Mosher

[57] ABSTRACT

In a homokinetic joint the annular extensions of the intermediate body are spaced apart from the inner surface of the outer linking element and the centering of the linking elements of the joint is entrusted to a couple of convex projections which jut laterally of the internal linking member of the joint in a direction which is perpendicular to the direction of the annular extensions, to cooperate with corresponding concave portions.

1 Claim, 4 Drawing Figures

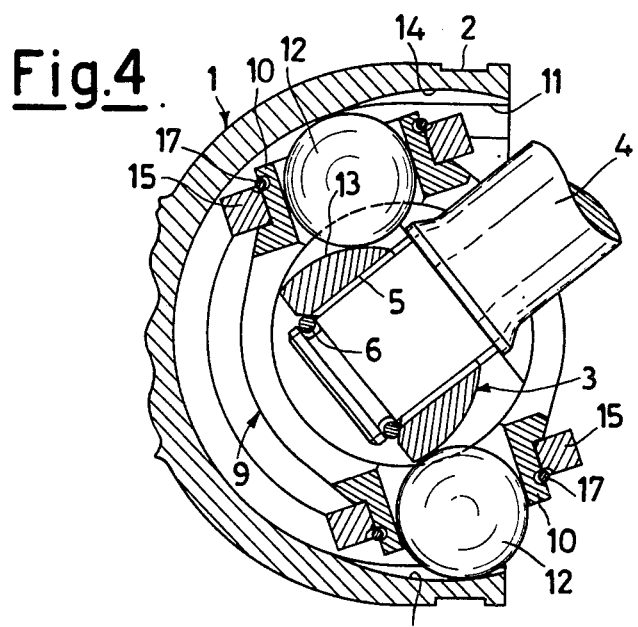
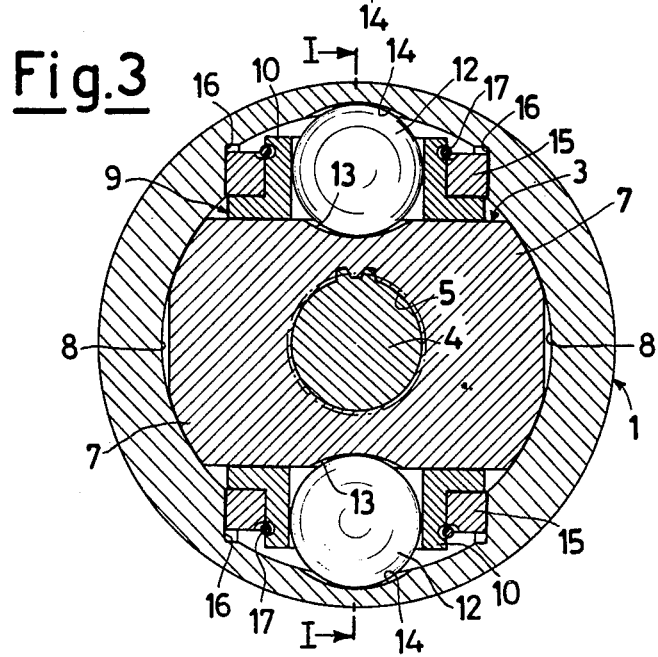

HOMOKINETIC JOINT

This invention relates to a novel and improved homokinetic joint which is particularly, but not exclusively, suitable for transferring the drive in front-drive motor vehicles.

It is already known, for example from the Italian Patent Nos. 852 184 and 913 375, a kind of homokinetic joint in which the connection between a linking element in the interior and an external linking element, the matter having a cuplike shape, is embodied by means of an intermediate cage-like body, from the sides of which protrude two symmetrical annular extensions which have convex end front surfaces which cooperate with the corresponding concave internal surface, this latter being substantially hemispherical, of the cup so as to ensure the centering of the internal linking element during its movements relative to the external linking element.

Such annular extensions receive respective spherical guiding elements which cooperate with respective arcuate paths formed on the outer surface of the internal linking element and on the internal surface of the external linking element so as to guide both linking elements in their relative movements with respect to one another according to a known principle, for example as disclosed in the U.S. Pat. No. 2,046,584. About such annular extensions there are arranged for rotation, in their turn, rings having a convex external front surface, which cooperate with shoulder surfaces of the inner face of the external linking element for transferring a torque from either linking element to the other.

One of the most serious problems with the joints of that kind is bound to the machining of the cup with an inner surface having a substantially hemispherical surface extended to the edge of the same cup, so as to ensure the correct centering of the two linking elements even at the maximum allowable angular deflection. As a matter of fact, to make a cup of such a shape, involves the necessity of effecting, after an initial crowing of the cap with a cylindrical edge, a milling and grinding operation of the internal surface of the cup until the desired hemispherical outline is obtained. To carry out such an operation, it is obviously necessary that the introduction of an appropriate tool into the cup is made possible: to do so, the cup as itself is provided with a couple of symmetrical windows which impart to the cup a forklike outline. This necessity weakens the cup structure and originates a dangerous tendency towards the widening of the cup under high stresses. Such a widening impairs the geometry of the joint, which thus loses its homokinetic properties.

Another problem, moreover, is the unreliable nature of the centering when the angular inclination of the two linking elements of the joint becomes high. The ever and ever reduced surface of engagement as provided by the arcuate paths formed on the inner surface of the cup to the end fronts of the annular extensions of the cage-like intermediate body as such end fronts are more and more approached to the cup mouth, actually originates a tendency towards the lack of centering and this, in practice, is a limitation to the maximum angle of deflection which could otherwise be obtained.

Having all these considerations in view, the principal object of the present invention is to provide a homokinetic joint of the general kind referred to above, for which no weakening windows are provided through the cup surface.

Another object of the present invention is to provide a homokinetic joint which, in addition, is such as to permit that high angular deflections may be obtained without suffering from centering problems.

According to the invention, these objects are achieved by means of an improved homokinetic joint, comprising an external cup-shaped linking elements, an internal linking element inserted into said cup and an intermediate cage-like body adapted to afford a homokinetic bond between said linking elements, said intermediate body being equipped with laterally and outwardly projecting annular extensions, within which respective guiding elements are housed which have a spherical shape and cooperate with respective arcuate paths of the outer surface of the inner linking element and of the inner surface of the outer linking element for guiding said linking elements in their movements relative to one another on planes which are mutually perpendicular and about which are arranged for rotation respective rings cooperating with shoulders of the inner surface of the outer linking element for transferring the torque from either linking element to the other, said joint being characterized in that said annular extensions of the intermediate body are spaced apart from the inner surface of the outer linking element and the centering of the inner linking element relative to the outer linking element is ensured by a couple of spherically convex projections which protrude laterally of said inner linking element in a direction perpendicular to that of said annular extensions and cooperate with corresponding spherically concave portions of the internal surface of the outer linking element.

Stated another way, the homokinetic joint according to the invention thus provides for using, to the end of centering, means which are different and differently arranged as compared with the most common convex end fronts of the annular extensions of the cage-like body of the homokinetic joints as known heretofore.

This approach permits that the end front surfaces are no longer in contact with the inner surface of the outer linking element and, that which is much more significant, that the corresponding portions of the inner surface of the outer linking element are clear of any engagement of cooperation with the end fronts. By so doing, it becomes possible to embody such portions, which are those equipped with the arcuate paths for the guiding spheres, in a shape which is no longer spherical, but, rather, substantially cylindrical one. The introduction of the tool for machining the spherically concave portions of the inner surface of the outer linking element is no longer conditioned by the presence of detrimental windows through the cup, so that the cup has an improved resistance and reliability no matter how high are the stresses to which it is subjected.

In addition, the centering in correspondence with the maximum angles of deflection is no longer affected by the reduction of the engagements as determined by the arcuate paths formed through the inner surface of the cup, so that even great angles of deflection can be obtained without any difficulty.

Figure 2:
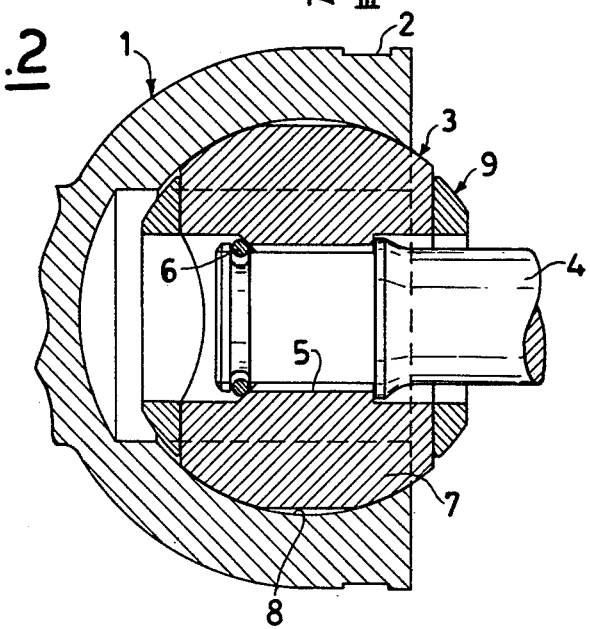

The foregoing and other features of the present invention will become fully conspicuous from the ensuing detailed description of a practical embodiment of the invention illustrated by way of example in the accompanying drawings:

In the drawings:

FIG. 1 shows a homokinetic joint according to this invention in axial cross-sectional view, taken along the line I—I of FIG. 3, FIG. 2 shows the joint in question in axial cross-sectional view, taken along the line II—II of FIG. 1, FIG. 3 shows the joint of the invention in transversal cross-sectional view taken along the line III—III of FIG. 1, and FIG. 4 shows the joint in cross-sectional view as in FIG. 1 under a condition of maximum angular deflection of the two interconnected linking elements.

The joint, as shown in the drawings, comprises an outer linking element 1, which is embodied in the shape of a cup, with an annular groove 2, in the vicinity of the cup mouthing for affixing the usual rubber hose for retaining the lubricant, and an inner linking member 3 which is fast to a shaft 4 by the agency of a crenellated connection 5 and a retaining ring 6.

As shown in FIG. 2, the inner linking member 3 has a couple of spherically convex lateral extensions 7, which cooperate in a rotatable manner with corresponding spherically concave portions 8, of the inner surface of the external linking element 1, so as to afford the necessary mutual centering of the two linking members.

About the inner linking member 3 there is arranged an intermediate cage-like body 9, which has a couple of annular projections 10, which protrude laterally towards the outside in a direction perpendicular to the direction in which the convex extensions 7 of the inner linking member jut (FIG. 3). Within such annular projections 10, that FIGS. 1, 3 and 4 show adequately spaced apart from corresponding substantially cylindrical portions 11 of the inner surface of the outer linking member 1, are both rotatably and slidably housed respective guiding balls 12 which cooperate with respective arcuate paths, 13 and 14, of the outer surface of the inner linking member 3 and of the inner surface of the outer linking member 1. About the annular projections 10, on the other hand, there are arranged from rotation the respective rings 15 which cooperate with shoulders 16 of the inner surface of the outer linking member 1 for transferring the torque from either linking member to the other. The rings 15 are retained in position by retaining rings 17.

We claim:

1. A homokinetic joint, comprising an external cup-shaped linking element, an internal linking element inserted into said cup and an intermediate cage-like body adapted to afford a homokinetic bond between said linking elements, said intermediate body being equipped with laterally and outwardly projecting annular extensions, within which respective guiding elements are housed which have a spherical shape and cooperate with respective arcuate paths of the outer surface of the inner linking element and of the inner surface of the outer linking element for guiding said linking elements in their movements relative to one another on planes which are mutually perpendicular and about which annular extensions are arranged for rotation respective rings cooperating with shoulders of the inner surface of the outer linking element for transferring the torque from either linking element to the other, said joint being characterized in that said annular extensions of the intermediate body are spaced apart from the inner surface of the outer linking element and the centering of the inner linking element relative to the outer linking element is ensured by a coupled of spherically convex projections which protrude laterally of said inner linking elements in direction perpendicular to that of said annular extensions and cooperate with corresponding spherically concave portions of the internal surface of the outer linking element, the portions of the inner surface of the outer linking element which confront said annular extensions of the intermediate body having a substantially cylindrical trend.

* * * * *